United States Patent
Hiltunen

(10) Patent No.: US 7,439,872 B2
(45) Date of Patent: Oct. 21, 2008

(54) METHOD AND MOBILE DEVICE FOR NON-VISUALLY SIGNALING THE STATE OF A MOBILE DEVICE

(75) Inventor: Miska Hiltunen, Witten (DE)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/543,868

(22) PCT Filed: Feb. 6, 2003

(86) PCT No.: PCT/IB03/00395

§ 371 (c)(1),
(2), (4) Date: Jul. 27, 2005

(87) PCT Pub. No.: WO2004/071113

PCT Pub. Date: Aug. 19, 2004

(65) Prior Publication Data

US 2006/0152382 A1    Jul. 13, 2006

(51) Int. Cl.
*G08B 5/00* (2006.01)
(52) U.S. Cl. .............. 340/691.1; 340/825.49; 340/407.1; 340/407.2; 340/384.5; 340/384.6; 455/418; 455/466; 455/567
(58) Field of Classification Search .......... 340/691.1, 340/825.44, 407.1, 407.2, 384.5, 384.6, 825.49; 455/567, 466, 418
See application file for complete search history.

(56) References Cited

U.S. PATENT DOCUMENTS

| | | | |
|---|---|---|---|
| 4,918,438 A * | 4/1990 | Yamasaki | 340/7.58 |
| 5,696,497 A | 12/1997 | Mottier et al. | 340/825.44 |
| 6,028,531 A | 2/2000 | Wanderlich | 340/825.44 |
| 6,104,909 A | 8/2000 | Baldwin et al. | 455/5.1 |
| 6,252,516 B1 * | 6/2001 | Mottier et al. | 340/7.58 |
| 6,415,164 B1 | 7/2002 | Blanchard et al. | 455/566 |
| 6,418,323 B1 | 7/2002 | Bright et al. | 455/550 |
| 6,963,762 B2 * | 11/2005 | Kaaresoja et al. | 455/567 |
| 7,148,789 B2 * | 12/2006 | Sadler et al. | 340/407.1 |
| 2001/0044328 A1 * | 11/2001 | Tsukamoto | 455/567 |
| 2002/0098876 A1 | 7/2002 | Engstrom et al. | 455/566 |

FOREIGN PATENT DOCUMENTS

| | | |
|---|---|---|
| EP | 0467071 A2 | 1/1992 |
| EP | 0688125 A1 | 12/1995 |
| EP | 1260949 A1 | 11/2002 |
| WO | WO 93/15590 | 8/1993 |

* cited by examiner

*Primary Examiner*—Tai T Nguyen
(74) *Attorney, Agent, or Firm*—Ware, Fressola, Van Der Sluys & Adolphson

(57) ABSTRACT

The present invention is related to a method for signaling the status of a mobile device, said mobile device comprising a user input interface, a storage including status information of said device and a signal generator, comprising the steps of receiving a status request from said user input interface, retrieving at least one status information from said storage according to said received status request, and which is characterized by generating an output signal by said signal generator, wherein said output signal comprises at least one non-visual signal component, said non-visual signal component being indicative of said retrieved at least one status information.

17 Claims, 3 Drawing Sheets

METHOD AND MOBILE DEVICE FOR NON-VISUALLY SIGNALING THE STATE OF A MOBILE DEVICE

BACKGROUND OF THE INVENTION

The present invention relates to mobile devices, especially small portable mobile devices that can be carried in a pocket. It further relates to mobile devices that admit autonomous or external events to have a great importance to the user of the device. The invention encompasses all mobile phones, palmtop computers, personal digital assistants, etc. The events include incoming phone calls, incoming messages, connections to communication or data networks, alarms, warnings and reminders. When those kinds of events occur the devices change their internal state. Normally, a visual check of the device makes the internal state of the device clear to the user by a displayed information. Sometimes, a visual check is not possible or even unwanted.

EP publication 0 467 071 A2 discloses a subscriber terminal in a telecommunication system. A conventional alarm tone indicating an incoming call may be replaced with a vibration to be sensed by the user. A device implementing the vibration can be located within the casing of the subscriber terminal or it can be a separate device that is connected to the subscriber terminal through a wired or a wireless data transmission connection.

Publications WO 93/15590 and U.S. Pat. No. 5,696,497 disclose a radio transceiver that employs both silent and audible alarms. A silent alarm can be implemented by vibration, for instance. The radio transceiver informs the user of an incoming call using the silent alarm and if the user does not answer the call within a predetermined time, the radio transceiver gives an audible alarm using tones. The device implementing the vibration is located in the subscriber terminal. The radio transceiver can also automatically change the alarm mode employed from silent alarm alone to audible alarm when the radio transceiver is connected to an external power supply or a holder. The user can control the duration of the alarm and the periodic alternation of silent and audible alarms.

EP publication 0 688 125 A1 discloses a mobile station employing an automatic vibration alarm. A device implementing the vibration is located in a module separate from the mobile station, for instance in a battery of the mobile station. Apart from vibration, the silent alarm can be for example implemented with a light.

Computer games employ controllers by which attempts are made to model the game's onscreen virtual reality. By means of the mouse, it is possible to model the onscreen reality. The mouse can provide a tactile feedback. For instance, when the cursor clicks an onscreen button, the user feels a snap in the mouse that represents clicking. It is also possible to sense e.g. various surface materials with the mouse. If the computer display shows ice, the mouse simulates a sliding movement, especially the speed of movement when the cursor is passing over the ice, as compared with the cursor moving over sand shown on the screen. When moving over the sand, the mouse can also shake.

The above described tactile alarm modes inform of an incoming call and user interfaces attempting to model virtual reality by means of touch. Mobile telephones are also known which inform the user with an even vibration that he has selected a closing function, i.e. power switch-off, or an opening function, i.e. power switch-on. This represents a tactile version of keypad tones.

SUMMARY OF THE INVENTION

It is currently possible to solely use a feedback mode as an acknowledgement feature for a certain key input or as a possibility to use a "silent" vibration alarm.

It is therefore desirable to further develop the capabilities of present mobile devices to further utilize the resources offered by mobile devices.

It is further desirable to further increase the convenience of a user in regard to the man-machine interface comfort of modem mobile devices.

It is further desirable to provide an improved portable device.

The mobile devices are becoming smaller and smaller and they are being carried in handbags and pockets. In noisy environments like cities, it is more and more likely to miss some events like incoming calls and receiving messages. There are situations where taking a mobile phone out into the public will be considered rude and impolite. Most people try to avoid this, but still want to get maximum benefit from their devices. So it is desirable to remove the need for visual checking of the state of a mobile device.

According to one aspect of the present invention, a method for non-visually signaling the status of a mobile device on demand is provided. The mobile device to perform said non-visual status signaling comprises at least a user input interface, a storage including status information of said device and a signal generator. The method comprises the steps of receiving a status request from said user input interface, retrieving at least one status information from said storage according to said received status request and generating an output signal by said signal generator, wherein said output signal comprises at least one non-visual signal component, wherein said non-visual signal component is indicative of said retrieved at least one status information.

The status request can be identified and entered by a key, a key combination, a key sequence, or the like, or e.g. a voice command. The incoming request is not to be regarded as an incoming phone call, an incoming message or the like and the status signal is rather responsive to user inputs instead of other events.

The status request can be identified by pressing the power key shortly, or by pressing a particular key or any key when the keypad is locked, or by pressing two special buttons simultaneously or in sequence regardless of a key-lock or a keypad lock. It is further possible to implement a possibility to enable a user to select a particular key or a particular key sequence to "silently" request the status of a mobile device. The expression "silent" is used to describe that an output signal is of the non-audible, non-visual or other unobtrusive type.

The status information is rather a status than an event information. The status detection comprises two different aspects in this context. The status default settings can decide on the one hand which kind of signal is to be put out and on the other hand what kind of information is to be coded in said non-visual signal. The kind of signal may be defined via respective stored data in a menu settings/tones/sound database. The kind of information may be defined via detected status properties stored e.g. in an "inbox" database of a mobile communication device.

The non-visually indicated status information can comprise information such as missed calls, received SMSs (short messages), received MMSs (multi-media messages), actual battery status, network coverage, current profile in use, alarm clock status (alarm ON/OFF) and/or the availability of a SIM (subscriber identification means) card.

In another embodiment of the present invention said receiving of a status request from a user input interface further comprises receiving an input from said user input interface and identifying said input as a status request. This feature is used to describe that the user input for triggering the silent status output can comprise a single input which is directly identified. Said input can also comprise a number of key inputs which are to be identified by the interface itself or by a controller in said mobile device.

In yet another example embodiment of the present invention the method further comprises selecting at least one status information stored in said storage, according to said received status request. The mobile device may comprise a number of different states comprising different properties, but should be able to provide only a single requested information of a single information which is supposed to be important for the user.

In another example embodiment said non-visual signal component is generated according to said at least one status information of said mobile device. The expression "status information" is ambiguous, as it denotes the type of the requested status and the status information itself. The output is to be generated according to the status type and the status information, if there is a need to inform the user of said device on the type of status information, so the device has to emit a respective signal. The device itself may decide which information it wants to emit. In response to a general status request the device only detects one unread SMS in the queue of the device and simply sends SMS in e.g. Morse Code and one long tone/vibration. The SMS in Morse code represents the status type and the vibration corresponds to the status information.

In an example embodiment, said non-visual signal component comprises a vibration signal. By using a vibration signal the standard interfaces and features of modern portable communication devices such as PDAs (personal digital assistants) mobile telephone and communicators can be used to implement the present invention without the need to perform costly hardware changes.

In another example embodiment said non-visual signal component comprises a tactile signal. This can be embodied as e.g. a small moving portion, a force feed back button or the like. Another implementation would be a mechanically changeable surface structure. This may be embodied as a retractable pair of pins, a retractable rib or other changeable surface properties.

In yet another example embodiment of the present invention said non-visual signal component comprises an electrical signal. In the simplest case the electric signal can be a signal to be transferred to a connected headset. Other implementations can comprise electrodes to be applied with a voltage that may be perceived by a user as small perceivable electroshocks. By using an electric voltage and a current the number of mechanically moving parts can be minimized, providing a superior reliability to the performance of the device, even under rough environmental conditions.

In another example embodiment of the present invention said non-visual signal component comprises an acoustic signal. The signal can be embodied as a computer generated voice output e.g. via a connected headset. The acoustic signal can be emitted via the conventional earpiece loudspeaker or via the alarm tone generator in case of e.g. a mobile telephone, PDA or timer device. Another implementation of an acoustic signal comprises an acoustic signal for bone conduction which is even applicable in the case that the user is e.g. carrying earplugs in a noisy environment.

According to yet another aspect of the invention, a software tool is provided comprising program code means for carrying out the method of the preceding description when said program product is run on a computer or a mobile device.

According to another aspect of the present invention, a computer program product downloadable from a server for carrying out the method of the preceding description is provided, which comprises program code means for performing all of the steps of the preceding methods when said program is run on a computer or a mobile device.

According to yet another aspect of the invention, a computer program product is provided comprising program code means stored on a computer readable medium for carrying out the methods of the preceding description, when said program product is run on a computer or a mobile device.

According to another aspect of the present invention a computer data signal is provided. The computer data signal is embodied in a carrier wave and represents a program that makes the computer perform the steps of the method contained in the preceding description, when said computer program is run on a computer, or a mobile device.

According to another aspect of the present invention, a mobile device is provided which is capable of outputting a non-visual signal on demand which indicates the status of said mobile device. The device comprises a user input interface for receiving a status request from a user, a storage for storing status information of said mobile device, a central processing unit (CPU) connected to said storage and connected to said user input interface, for receiving said status request and retrieving status information. Said CPU is configured to generate output signals, which are indicative of said retrieved status information. A signal transmitter is connected to said CPU, for non-visually outputting said output signals generated by said CPU.

The invention comprises any non-visual way that can be used to check the state of a mobile device. The term "non-visual" means that it is not required for the user to look at the device to perform this status check. Another point of the invention is that the checking happens after the fact, i.e. the event of entering said status. The current and known methods of notifying a user of a mobile device of an event that is currently happening are no subject of the present invention. The present invention aims to enable a user to non-visually check the state of a mobile device when nothing is happening but might have already happened.

The present invention is to provide a possibility to enable for example a user carrying a mobile phone in his pocket which is preset to vibrate when a call is being received or when a message arrives. Sometimes the user misses a call or another event because of distractions or just because the vibration of the phone is not strong enough to be noticed. Then it would be useful if the user could touch the phone in his pocket and feel if one or several messages have been received or if one or more calls have been missed (or have not been answered). The feedback may be given in any of the known ways, like sound or vibration.

In another example embodiment said signal transmitter comprises a vibration device. The vibration device can be embodied e.g. as a mechanical oscillator, a motor driven excenter, as known in the art. One possible implementation is a vibrating button on the side of the device. The button should be easy to find and press. Pressing the button would activate the status check in the device and according to the state, a different vibration code could be activated. For example, if one or more calls have been received but not answered (i.e. missed) the button would vibrate quickly for a second. If one or more messages had been received but were not read yet, the button could vibrate once for each message. If both calls were missed and messages are unread, the signal codes could be combined. Another implementation could be based on sound coding or even voice announcement, i.e. "You have 2 new unread messages" would be generated by the device on demand.

In yet another embodiment of the present invention, said signal transmitter comprises a tactile signal generator. A tactile signal generator can comprise a surface structure changing element. Alternatively, the tactile signal generator can generate perceptible temperature changes as a signal, e.g. a small infra red light source may be used to implement the temperature generator. Another implementation of a tactile signal generator can e.g. comprise an arrow like structure that can be moved by the device in different directions to indicate different states of the device. The tactile surface structure may be combined with a vibrating output. Another possible tactile signal generator can comprise a softness or a "furryness" or a "layeredness" of a "terrasseness" of a tactile surface to indicate a value of a status.

In another example embodiment of the present invention said signal transmitter comprises an electric signal generator. The electric signal generator can be used to emit minor electric shocks via electrodes connected to said generator. In case that electrodes and a voltage are used as a non-visual user output it should be prevented that the electrodes can come in touch with the human ear or the human head in the proximity of the ear. Additionally, the voltage, the frequency and the internal resistance of the voltage generator has to be chosen in such a way as to ensure that the user can not be injured.

In another example embodiment of the present invention said signal transmitter comprises an electro-acoustical transducer. A simple implementation of a transducer can be a loudspeaker e.g. in a headset. Another implementation of an electro-acoustic transducer can be as an oscillator to provide a signal for bone conduction.

In yet another example embodiment of the present invention said mobile device comprises a subscriber terminal in a telecommunication system such as e.g. a mobile telephone. The silent or non-visual status indication feature can also be implemented in devices such as mobile phones, palmtops, PDAs, handheld GPS devices or portable game consoles. It is even possible to implement the present invention into car keys or keys to the flat, wherein a user can non-visually determine if the house or the car is locked.

BRIEF DESCRIPTION OF THE DRAWNGS

In the following, the invention will be described in detail by referring to the enclosed drawings in which.

DETAILED DESCRIPTION OF THE INVENTION

Figure 1:
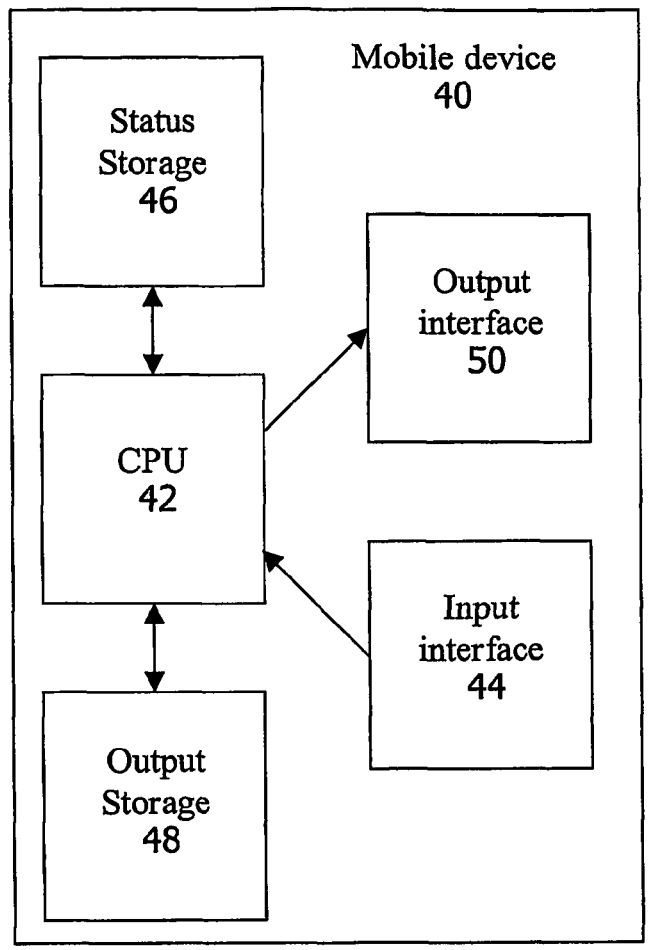
FIG. 1 is a simplified block diagram illustrating an example of the structure of a portable device.

FIG. 1 is a simplified block diagram illustrating an example of the structure of a portable device. The depicted device 40 comprises an input interface 44, an output interface 50, a central processing unit (CPU) 42, a status storage 46 and an output storage 48. The device 40 can receive a user input via said input interface 44. If said input is identified as a status request which is to be output in a non-visual way, the CPU 42 can identify said request, query said storage 46 for the requested status information and select a corresponding output signal from output storage 48 and generate a non-visual output via output interface 50.

The input from the user interface 44 can directly be transferred to the CPU 42. The input from the user interface 44 may be preprocessed before being sent to the CPU 42. The preprocessing can comprise an input analysis to filter random input from selected input sequences e.g. to wake up the device from a sleep mode or to activate pre-selectable functions such as the present unobtrusive status indication. For example a key combination "7-2" representing "S-B" may be used to "silently" request the battery status. In dependence of the requested status information, CPU can select a particular signal type, modify it according to the pre-stored settings and generate an output signal comprising the requested information. The CPU receives said request and puts out a respective non-visual output via interface 50. The output interface 50 is usually a signal transducer such as a vibration device, a tactile signal generator, an electrical signal generator or an electro-acoustical transducer.

Figure 2:
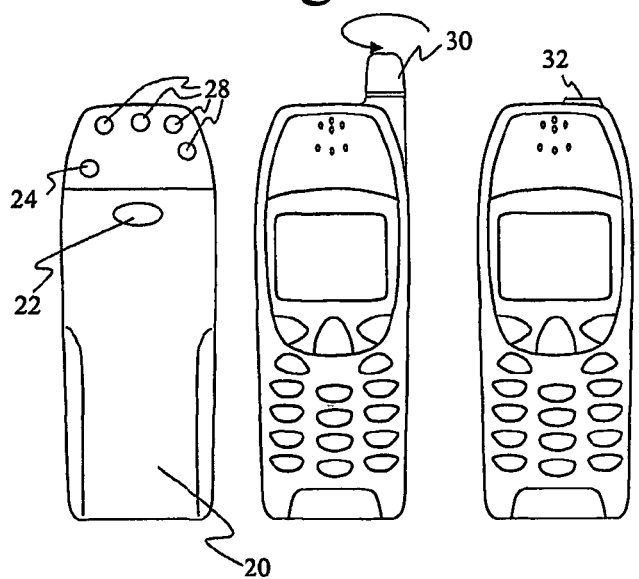
FIG. 2 shows three different examples of non-visual signal transducers.

FIG. 2 shows three different example embodiments of non-visual signal transducers integrated in a mobile telephone. The mobile telephone on the left is depicted from the rear. The back view shows a battery pack 20 locked to the phone via a catch 22. Above the catch 22 there is depicted an antenna port or antenna contact 24. There are four further electrodes 28 depicted, arranged on the backside of the mobile phone. The electrodes 28 can be used as a non-visual signal output. The electrodes 28 can emit electrical pulses that can be perceived by a human fingertip short circuiting two of said electrodes. The potential differences between different pairs can be used code different status, like number of received calls, number of received MMS or number of received SMS. The location of the electrodes is preferably on the backside of said mobile phone to ensure that voltage of the electrodes is not hurting the user when emitting voltage pulses in the area of the human head surrounding the human ear. The internal resistance and the voltage between two electrodes is to be selected in a way that painful experiences or severe injures are impossible. The intensity of the electroshocks may be selected according external conditions to ensure safe operation even in humid environments such as pockets. The intensity of the electroshocks may be user selectable via a menu in the settings of said mobile device.

The mobile phone depicted in the middle is equipped with a driven turning antenna tip 30 as an output interface. The non-visual status signals are output as turnings or angular changes of the antenna tip 30. A user can touch the antenna tip 30 and feel a sequence of turnings indicating a particular state of said device. The antenna tip 30 may be operated by a small motor in the mobile phone. Preferably, the antenna tip 30 only oscillates at an angle of e.g. +−30 degrees, ensuring that it is prevented that hair or earrings get wound up on said antenna tip and ripped of by said antenna tip, if the non-visual status indication is activated during a telephone call. The driven antenna tip 30 can also be equipped with a key or a switch which is activated upon pushing the antenna tip 30 down in, signaling that a user is actually touching the output interface and is therefore able to perceive the non-visual status signal. Although the movement of the antenna tip may be visually perceived by a user holding the device, it is the ability to feel the motion of the antenna, that is characterizing the motion as a non-visual signal output.

The mobile phone on the right uses a turntable or a linear moving output interface 32. As in the case of the rotating or pivoting antenna tip a turntable or a sliding bar can be motor or gear operated. A turntable or a linear moving output interface 32 can further be equipped with an activation button, to ensure that the output is only executed when the user is actually touching the output interface 32. Thereby it can be prevented that the mobile and therefore battery operated device wastes energy by trying to non-visually notify a user actually not present.

In case of the depicted embodiment, the silent status notification can be started by an input into the standard ITU-T keypad of said device. Alternatively, the non-visual status information signal can be requested by an input on to the electrodes 28, the antenna tip 30 or the turntable element 32. The electrodes can be provided with a low voltage to measure the electrical resistance as e.g. in the case of soft-touch sensor buttons. For the same reason the antenna tip 30 or the moving element 32, can also be provided with a sensor or with a push button.

Figure 3:
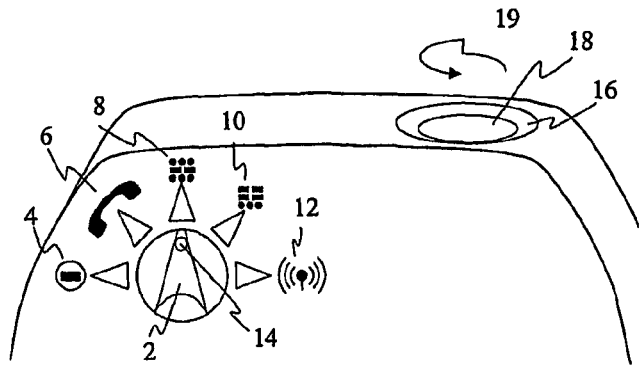
FIG. 3 shows a partial view of a device having a non-visual signal transducer according to the present invention.

FIG. 3 shows a partial view of a device according to one embodiment of the present invention for non-visually signaling the state of said device. The device is depicted as a perspective view of a head portion of a mobile device. The user input device or user input interface is depicted as the rotary selector switch 2. The rotary switch 2 is provided with a small projection 14 to enable a user to identify the position of the selector 2 without the need to look at the selector 2. The selector 2 can be moved or turned e.g. by pressing a fingertip onto the selector 2 and turning it clockwise or counter clockwise. In the present embodiment the selector comprises five different positions. The first position 4 is the "off" position in which the non-visual status indication is simply turned off. The next position is indicated by a telephone receiver 6 to indicate that in this position the number of missed calls (or e.g. the number of mailbox entries) is to be indicated non-visually. The next position 8 is indicated by a symbol depicting three dots two bars followed by three dots. This represents the sequence "SMS" for "short message service" in Morse Code, as it is known from selectable message alert tones. If the selector is switched to position 8, the user can retrieve the number of received but not yet read short messages. The next position 10 is indicated by a symbol depicting two pairs of bars followed by three dots. This represents the sequence "MMS" for multi media message in Morse Code, as it is known from selectable message alert tones. If the selector is switched to position 10, the user can non-visually retrieve information about the number of received but not yet read/viewed multi media messages.

The last position 12 indicates a pictogram showing an antenna and a symbol of radio waves, to indicate that in position 12 a user can non-visually get information concerning the actual field strength of the next base station. The field strength received from a device represents a value that is correlated to the quality of a radio connection to the base station of a RF device. By using the Morse Code and pictograms the need to manufacture different hardware versions of a single electronic device can be reduced.

In the depicted embodiment the user can select the information to be provided in a non-visual way by moving the selector to the wanted position and touching the disc 18. When touching the disc 18, a contact or proximity signal can be used to start the output of a status indicating non-visual signal sequence. The disc can be a motor operated turning disc, a plunger-like vertically oscillating disc. To prevent that the device can get stuck or gets in touch with hair, earrings or earlobes, the disc is slightly retracted into the body of the mobile device by a transition portion 16. The disc can be moved in small rotational or in rotational and a vertically oscillating movements as indicated by the arrow 19. A user touching the disc 18 with a fingertip can feel its movements. The movements can comprise predefined or pre-selectable patterns to enable a user to surely identify a number of movements that are indicative of e.g. a number of stored messages.

Figure 4:
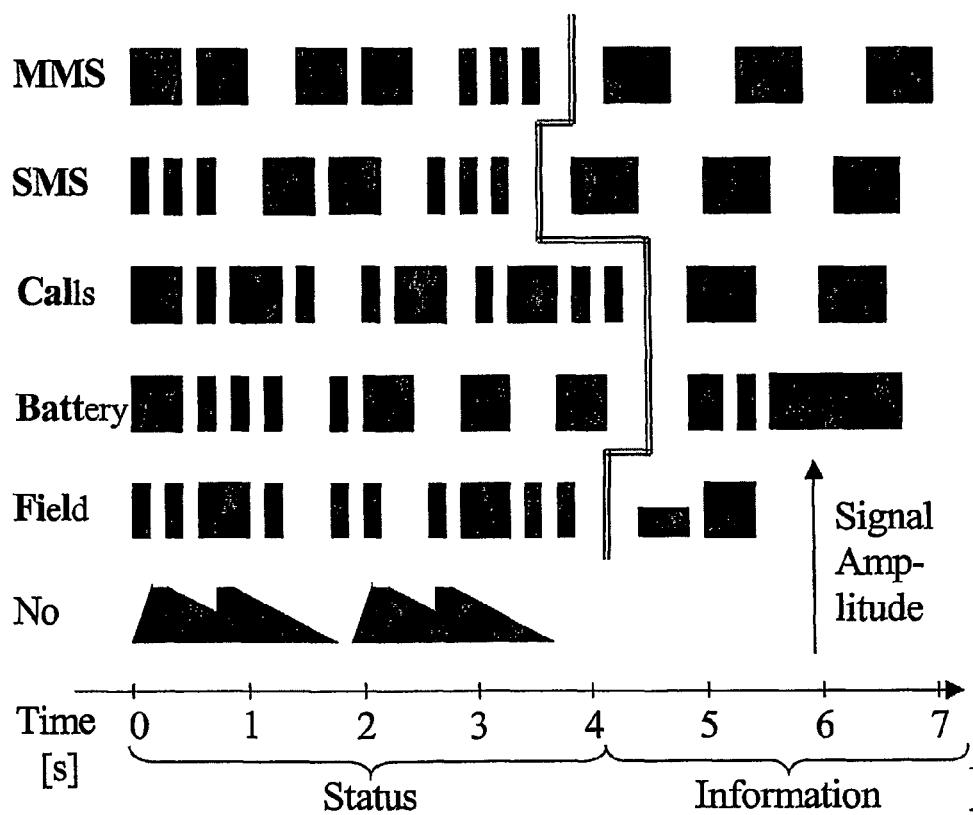
FIG. 4 illustrates various signaling patterns in a coordinate system where the x-axis represents time and the y-axis represents amplitude.

FIG. 4 illustrates various non-visual or "silent" alarm patterns in a coordinate system where the x-axis represents time and the y-axis represents a signal amplitude. The uppermost sequence labeled "MMS" depicts a possible output for indication of three (previously) received unread MMSs (multimedia messages). The first section of said sequence represents a Morse Code representation of the character sequence "MMS". This status-type sequence is necessary to indicate or to specify the information contained in the following sequence. The following information sequence of three uniform signals of even amplitude is used to indicate that there are actually three unread MMS. The first five status indication patterns have the same amplitude for a given time. For clarity, FIG. 4 does not show any variation in the frequency of the output signals. It is to be noted that in dependence of the selected output means a variation in the frequency is also possible e.g. in case of a vibration generator or an electroacoustical transducer. During one non-visual status signal pattern, a single or a number of different pulse sequences may be employed.

As in the case of the above discussed MMS status, the "SMS" sequence and the "Call" sequence use Morse Code for the identification of the type of status, followed by a sequence of uniform signs, wherein the number of uniform signs code the number of messages. Basically, the depicted output signal has the form of status type + number.

The following two status types "Battery" and "Field" can not so easily be expressed as a simple number. So in the case of the "Battery" status information a sequence of two time coded signals are outputted. The signal length of the first outputted signal corresponds to the actual charging status and the signal length of the second signal corresponds to the maximum storage capability of the battery. A small signal between the first signal and the second signal corresponds to a fraction line. A user can interpret the ratio of the signal lengths as a fraction in the form of ⅞ to indicate that fully charged and a fraction like ⅔ can be used to indicate that the battery needs to be recharged.

In the case of the "Field" status information a sequence of two amplitude coded signals are outputted. The signal amplitude of the first outputted signal corresponds to the field strength actually received and the signal amplitude of the second signal corresponds to the maximum field strength. A user can interpret the ratio of the signal amplitudes as a representation of a signal quality to be expected.

The lowest signal sequence represents a "No" signal. The status signal "no" has an amplitude varying for in a given time. At the beginning of the Sequence "No", the amplitude increases relatively rapidly, in the middle of a signal element the amplitude decreases for a moment, resumes the level it had before and fades out at the end of the signal element. The alarm pattern of the sequence "No" may also have another variable characteristic, e.g., the frequency: approximately during the first sixth, the frequency is higher, then the frequency becomes lower. The "No" sequence can be used to indicate that there are actually no specific or unspecific status information available. The "No" sequence can be combined with any kind of status information such as "No SMS", or "No Calls".

It is to be noted that the present invention is not restricted to the depicted character coding based on Morse-type coding, but that some other coding which employs frequency and/or amplitude in addition to duration can also be employed.

Other possible pulse or signal patterns used in the sequences of signaling of a status information can comprise single impulses, groups of two or three impulses, a short impulse followed by a long one, a long impulse followed by a short one, a pair of short impulses followed by a longer one, a long impulse followed by a pair of short impulses It is also possible to automatically switch to a speech output, if the device detects a connected headset, or if the device received the status request via speech input.

Figure 5:
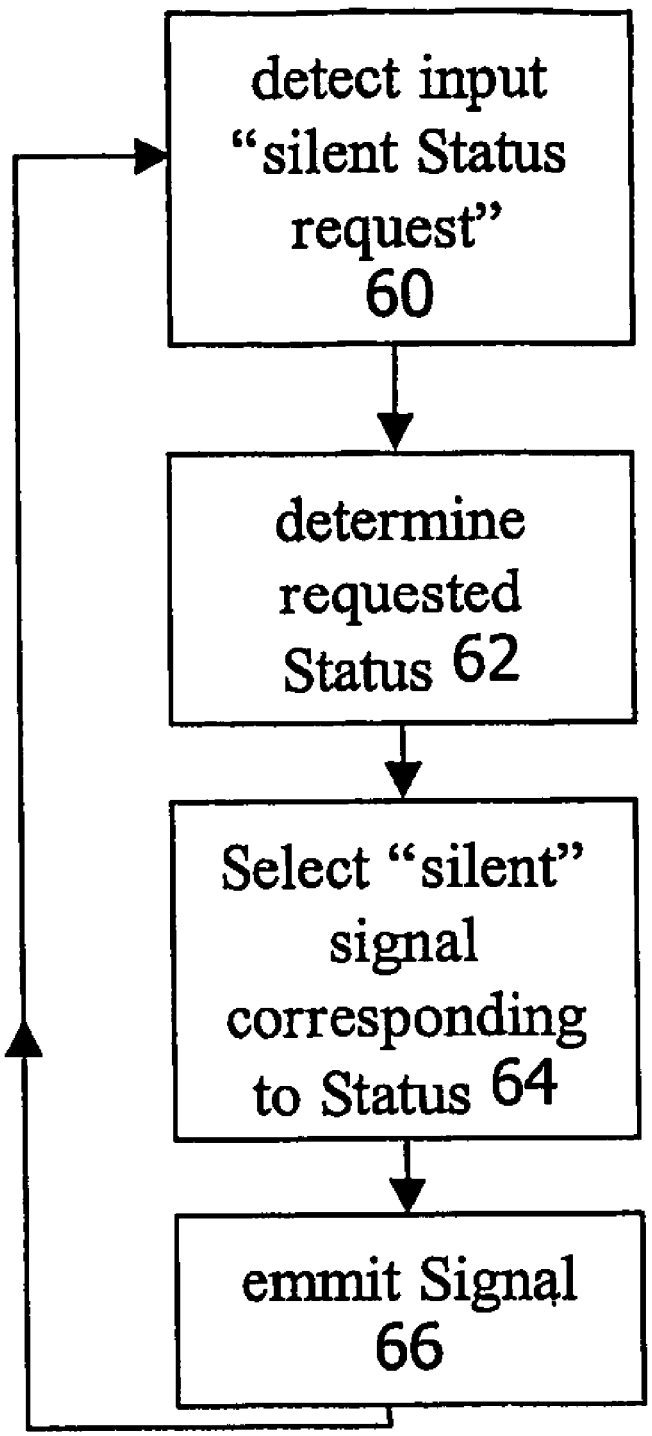
FIG. 5 is a flowchart showing steps of the method of non-visually signaling the status of mobile device in accordance with one embodiment of the present invention.

FIG. 5 is a flowchart showing steps of the method of non-visually signaling the status of a mobile device in accordance with one embodiment of the present invention. The performance of the method starts from block 60. In block 60, an event that is identified as a "silent status request" is detected.

The status request can be a specific request such as a request for the number of e.g. received (but not yet read) short messages. The request can be an unspecific request. In case of a specific status request, the type of data to be retrieved is clearly defined. So in case of a status request like SMS it is sufficient to determine 62 the number of newly received messages (i.e. the requested status) determine and select a (pre-selected) output signal 64 and output or emit 66 a signal representing only the number of newly received messages.

In block 62, the type of status request is checked. This can be done by querying a respective database e.g. in a mobile device, the message inbox containing the number of newly received short messages. In the next step a signal corresponding to the number of newly received messages is selected from a number of pre-stored signal patterns. This can also just include the call of a predetermined signal. A more sophisticated approach of the signal selection can also include the selection of different properties of the non-visual output signal according to pre-stored or actually measured data such as e.g. the level of ambient noise. So a user may be able to select the properties of the non-visual signal such as (vibration, movement, acoustical output via phones or via bone conduction or the like), or the amplitude of certain signal patterns, the frequencies, and so on.

If the request is an unspecific request, the device has to specify the information coded in the output signal. In a simplest case, the status request only comprises an information that the status is non-visually requested. In the next step the mobile device itself has to define which status information is to be emitted. In the simplest case all possible status information is emitted in sequence, e.g. starting with messages, calls and proceeding with status information such as actual battery status, received field strength (indicating an expected connection quality or the ability to receive messages) or operational status of the subscriber identification means (SIM).

In a more sophisticated approach of an unspecific request, the user simply starts a status request, the device checks all available status parameters and can select any of these parameters for an output signal which exceed or fall below a determined threshold. The threshold may be determined dynamically. After the selection of important status information, the device codes the information identifying the type of status and information related to the actual state to a composed output signal and emits said signal.

Other intermediate forms of status requests can e.g. request the general status of all kinds of messages that can be received by said mobile device.

The non-visual output signal can also be used to indicate e.g. a sender of the message (assuming respective settings). A simple embodiment could use predetermined sender specific alarm tones (vibrations) or other sender specific signal coding to indicate the sender of the received but not read message or not accepted call. The method can be advantageously modified by means of the described characteristics.

The present invention further provides a benefit for handicapped persons. Apart from the above described benefits for non handicapped persons the present invention further increases the abilities of mobile phones to be used by visually and aurally impaired persons.

This application contains the description of implementations and embodiments of the present invention with the help of examples. It will be appreciated by a person skilled in the art that the present invention is not restricted to details of the embodiments presented above and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Method for indicating status of a mobile device, said mobile device comprising a user input interface, a storage including status information of said device and a signal output interface, comprising:
   receiving a status request from said user input interface,
   retrieving at least one status information item from said storage according to said received status request, and
   generating a signal for output by said output interface, wherein said output signal comprises at least one non-visual signal component, said non-visual signal component being indicative of said retrieved at least one status information item.

2. Method according to claim 1, wherein said receiving a status request from said user input interface further comprises receiving an input from said user input interface and identifying said input as a status request.

3. Method according to claim 1, further comprising selecting from said storage at least one status information item, according to said received status request.

4. Method according to claim 1, wherein said non-visual signal component is generated according to said at least one status information item of said mobile device.

5. Method according to claim 1, wherein said non-visual signal component comprises a vibration signal.

6. Method according to claim 1, wherein said non-visual signal component comprises a tactile signal.

7. Method according to claim 1, wherein said non-visual signal component comprises an electric signal.

8. Method according to claim 1, wherein said non-visual signal component comprises an acoustic signal.

9. Computer program product embodied in a computer readable storage medium of a mobile device, comprising instructions for carrying out the method of claim 1.

10. Computer program product embodied in a computer readable storage medium of a sever, comprising instructions for carrying out the method of claim 1, wherein said program product is downloaded from the server and run on a mobile device.

11. Mobile device comprising:
   a user input interface for receiving a status request from a user, a storage for storing status information of said mobile device, a central processing unit (CPU) connected to said storage and to said user input interface, for processing said status request and retrieving at least one status information item from said storage according to said received status request, said CPU being configured to generate output signals indicative of retrieved status information item, and a signal transmitter connected to said CPU, for non-visually outputting said generated output signals.

12. Mobile device according to claim 11, wherein said signal transmitter comprises a vibration device.

13. Mobile device according to claim 11, wherein said signal transmitter comprises a tactile signal generator.

14. Mobile device according to claim 11, wherein said signal transmitter comprises an electric signal generator.

15. Mobile device according to claim 11, wherein said signal transmitter comprises an electro-acoustical transducer.

16. Mobile device according to claim 11, wherein said mobile device is a subscriber terminal in a telecommunication system.

17. Mobile device for outputting on demand a non-visual signal indicating a status of said mobile device, said device comprising:

means for receiving a status request from a user, means for storing status information of said mobile device, means for processing said status request, retrieving at least one status information item from said storage according to said received status request, and generating output signals indicative of retrieved status information item, and means for non-visually outputting said generated output signals.

* * * * *